(12) United States Patent
Aich et al.

(10) Patent No.: US 10,131,204 B2
(45) Date of Patent: Nov. 20, 2018

(54) SMART CONNECTED CLIMATE CONTROL

(71) Applicant: Ford Global Technologies, LLC, Dearborn, MI (US)

(72) Inventors: Sudipto Aich, Palo Alto, CA (US); Jamel Seagraves, Mountain View, CA (US); Casey Bryan Feldman, Sunnyvale, CA (US); Yonathan Aklilu Redda, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 686 days.

(21) Appl. No.: 14/589,489

(22) Filed: Jan. 5, 2015

(65) Prior Publication Data

US 2016/0193895 A1 Jul. 7, 2016

(51) Int. Cl.
| | | |
|---|---|---|
| *B60H 1/00* | (2006.01) | |
| *F24F 11/30* | (2018.01) | |
| *F24F 11/62* | (2018.01) | |
| *F24F 110/00* | (2018.01) | |
| *F24F 120/20* | (2018.01) | |
| *F24F 11/64* | (2018.01) | |
| *F24F 11/56* | (2018.01) | |

(52) U.S. Cl.
CPC ..... *B60H 1/00985* (2013.01); *B60H 1/00657* (2013.01); *F24F 11/30* (2018.01); *F24F 11/62* (2018.01); *F24F 11/56* (2018.01); *F24F 11/64* (2018.01); *F24F 2110/00* (2018.01); *F24F 2120/20* (2018.01)

(58) Field of Classification Search
CPC ............. B60H 1/00985; B60H 1/00657; F24F 11/001; F24F 11/006; F24F 2011/0057; F24F 2011/0063; F24F 2011/0068
See application file for complete search history.

(56) References Cited

U.S. PATENT DOCUMENTS

| | | | |
|---|---|---|---|
| 2007/0298758 A1 | 12/2007 | Verma et al. | |
| 2008/0126929 A1 | 5/2008 | Bykov | |
| 2012/0061480 A1* | 3/2012 | Deligiannis | .......... F24F 11/0012 236/51 |
| 2014/0365017 A1* | 12/2014 | Hanna | .................... F24F 11/001 700/276 |

(Continued)

OTHER PUBLICATIONS

Samsung Electronics, Samsung Smart Home Aims to Integrate All Your Smart Devices on One Platform, Techhive article, Jan. 5, 2014, 3 pages. <http://www.techhive.com/article/2083990/samsung-smart-home-aims-to-integrate-all-your-smart-devices-on-one-platform>.

*Primary Examiner* — Travis Ruby
(74) *Attorney, Agent, or Firm* — Franklin A. MacKenzie; Brooks Kushman P.C.

(57) ABSTRACT

A system may receive historical climate control selections by a user and environmental conditions across a plurality of climate-controlled contexts; identify a correlation of temperature settings in a first of the climate-controlled contexts to temperature settings in a second of the climate-controlled contexts for an environmental condition; and update a user profile of the user according to the correlation. The system may also identify an upcoming user transition from a first climate-controlled context to a second climate-controlled context; and precondition the second context in accordance with the correlation.

15 Claims, 11 Drawing Sheets

(56) References Cited

U.S. PATENT DOCUMENTS

| | | | |
|---|---|---|---|
| 2015/0129192 A1* | 5/2015 | Boss | B60H 1/00771 165/202 |
| 2015/0168003 A1* | 6/2015 | Stefanski | F24F 11/0034 165/237 |
| 2015/0369508 A1* | 12/2015 | Rosen | F24F 11/0034 165/237 |

* cited by examiner

SMART CONNECTED CLIMATE CONTROL

TECHNICAL FIELD

Aspects of the disclosure generally relate to automatic climate control across multiple contexts according to learned user profiles.

BACKGROUND

Automatic climate control is increasingly prevalent in vehicles today. In some vehicles, a driver chooses a temperature setting, and a control system operates a climate control system to achieve the desired temperature. Additionally, home automation systems enable control of various home systems, such as lighting, heating and air conditioning. Some home automation systems may be integrated with home security systems such that when an alarm is raised, lights may be activated, or the homeowner may be notified.

SUMMARY

In a first illustrative embodiment, a system includes a computing device programmed to identify an upcoming user transition from a first climate-controlled context to a second climate-controlled context; and precondition the second context in accordance with a correlation, for current environmental conditions, of climate control selections in the first context to climate control selections in the second context, the correlation identified according to a user profile including historical climate control selections and environmental conditions across a plurality of climate-controlled contexts.

In a second illustrative embodiment, a system includes a computing device programmed to receive historical climate control selections by a user and environmental conditions across a plurality of climate-controlled contexts; identify a correlation of temperature settings in a first of the climate-controlled contexts to temperature settings in a second of the climate-controlled contexts for an environmental condition; and update a user profile of the user according to the correlation.

In a third illustrative embodiment, a computer-implemented method includes identifying an upcoming user transition from a first climate-controlled context to a second climate-controlled context; and preconditioning the second context in accordance with a correlation, for current environmental conditions, of climate control selections in the first context to climate control selections in the second context, the correlation identified according to a user profile including historical climate control selections and environmental conditions across a plurality of climate-controlled contexts.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Home automation devices, such as learning thermostats, security cameras, smoke alarms, are becoming more popular. One goal of such learning devices is to perform data analysis on past user actions to inform future device settings in the same context. In an example, a home thermostat may record a usage profile of historical temperature settings and outdoor temperatures in the home context, and may use the information to make context-aware decisions based on outdoor temperature regarding how to automatically set the thermostat temperature for the home.

User profile information may be derived from driver interactions with their vehicles, as drivers may adjust their settings and climate preferences inside the interior cabin of the vehicle. In an example, vehicle usage information, such as cabin temperature settings, ambient temperature, location, and time of day may be collected from the in-vehicle network. This data may be collected over time, including various trips and in varying environmental conditions.

A system may learn a detailed user profile by combining historical usage and environmental information collected from both the home and the vehicle. By using the detailed user profile, user information collected in one context may be used to inform decision-making in another context. For instance, a user's vehicle temperature settings may be used to inform how the user's home temperature settings should be set when the user returns home. As another possibility, a user's home temperature settings may be used to inform how the user's vehicle temperature settings should be set when preconditioning the vehicle. Further aspects of the use of data collected in one user context to inform other user contexts is discussed in detail below.

Figure 1:
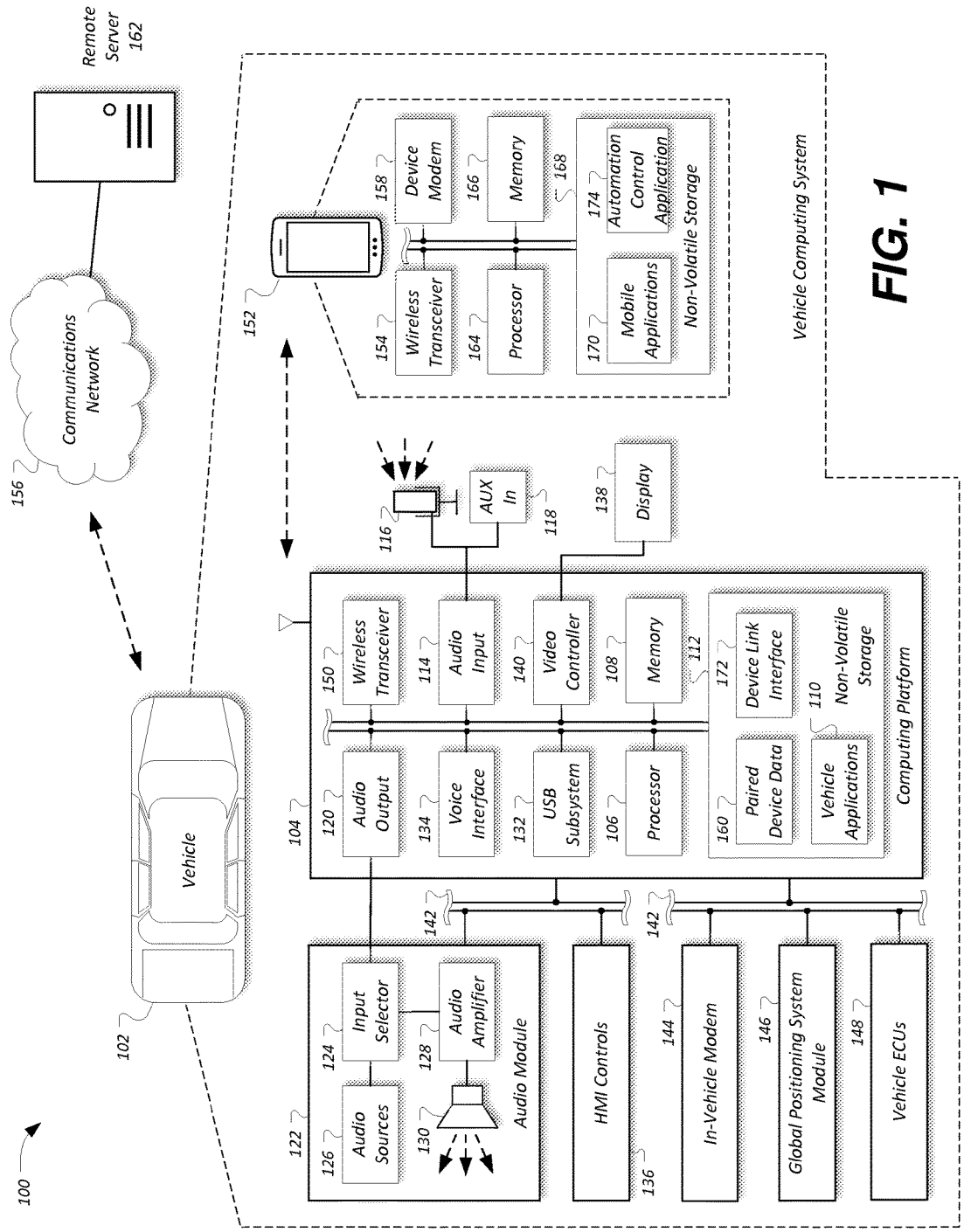
FIG. 1 illustrates an example diagram of a system that may be used to provide telematics services to a vehicle.

FIG. 1 illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headsets (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, ambient temperature sensor information, heating and cooling temperature settings for one or more vehicle zones, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as mobile smartphones or other cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interface 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif.

Figure 2:
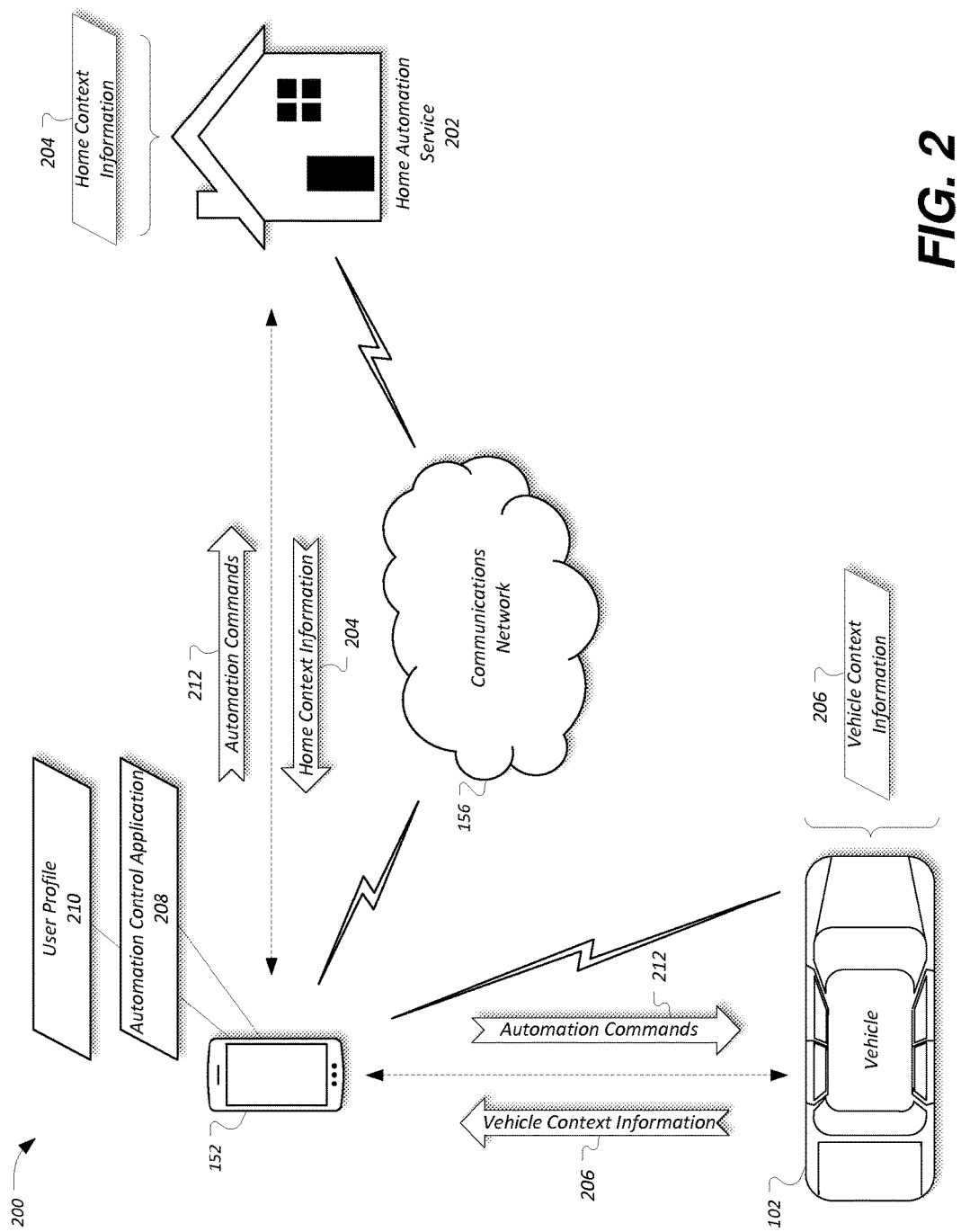
FIG. 2 illustrates an example automation control application utilizing home context information and vehicle context information to provide automation commands in accordance with a user profile.

FIG. 2 illustrates an example automation control application 208 utilizing home context information 204 and vehicle context information 206 to provide automation commands 212 in accordance with a user profile 210. As illustrated, the system 200 includes a mobile device 152 hosting the automation control application 208 and the user profile 210 stored to the memory 166 of the mobile device 152. The automation control application 208 may generate the user profile 210 based on the home context information 204 received from a home automation service 202 and the vehicle context information 206 received from the vehicle 102. Using the user profile 210, the automation control application 208 may provide automation commands 212 to the home automation service 202 and the vehicle 102 systems. For instance, a user's vehicle temperature settings may be used to inform how the user's home temperature settings should be set. As another possibility, a user's home temperature settings may be used to inform how the user's vehicle temperature settings should be set. It should be noted that the illustrated system 200 is merely exemplary, and more, fewer, and/or differently located elements may be used. As one example, the system 200 may include multiple home automation services 202. As another example, the automation control application 208 may be executed in whole or in part by the computing platform 104 or by another vehicle processor.

The home automation service 202 may be configured to receive home automation commands from connected devices (e.g., the mobile device 152), and provide the home automation commands to be executed to devices at controlled customer premises (e.g., customer homes). The automation service 202 may be further configured to provide command responses to the senders of the home automation commands to inform the command requester of the status of the home automation commands. Exemplary remote automation services 202 may include, as some non-limiting examples, the Nest smart thermostat application programmer interface (API) maintained by Google, Inc. of Mountain View, Calif., the Schlage Z-Wave Deadbolt cloud connected API maintained by Allegion Plc of Carmel, Ind., the ecobee thermostat API maintained by ecobee Inc. of Toronto, Ontario, and the Honeywell Comfort Control API maintained by Honeywell International, Inc. of Morristown, N.J.

The automation service 202 may be configured to require security credentials to allow a device, such as the mobile device 152, to access the automation features of the automation service 202. As some examples, the automation service 202 may require an account name or username, a password, a passphrase, a personal identification number, a fingerprint, or other credentials. Based on the received credentials, the automation service 202 may ensure that the requesting device is authorized to access the automation service 202 features for the corresponding user or user account.

The home context information 204 may include information regarding current and historical state of the devices and sensors controlled by the home automation service 202. As some possibilities, the home context information 204 may include current and previous outside temperature readings for the home, current and previous heating and cooling thermostat settings for one or more zones of the home, and additional sensor information such as smoke detector or carbon monoxide sensor information available via the home automation service 202. An authorized client connected to the home automation service 202 may be able to query the automation service 202 to retrieve the home context information 204.

The vehicle context information 206 may include information regarding current and historical state of the devices and sensors controlled by the vehicle 102. For instance, the vehicle context information 206 may include climate information received from the climate control management module of the vehicle 102. As some possibilities, the climaterelated vehicle context information 206 may include current and previous outside temperature readings for the vehicle 102, vehicle 102 time and location information, current and previous heating and cooling thermostat settings for one or more zones of the vehicle 102, and additional information such as wiper status information and defroster status information. In an example, vehicle context information 206 may be retrieved from the vehicle climate control management module and/or GPS system via the device link interface 172 connectivity to the computing platform 104.

The automation control application 208 may be configured to receive contextual information from various sources, and use the contextual information to generate a user profile 210 descriptive of the usage patterns of the user. In an example, the automation control application 208 may be configured to query the automation service 202 over the communications network 156 for home context information 204 using security credentials provided by the user of the mobile device 152. In another example, the automation control application 208 may be configured to query the vehicle 102 for the vehicle context information 206 while paired with the computing platform 104. In yet a further example, a vehicle application 110 installed to the computing platform 104 may be configured to monitor the vehicle context information 206, and may provide the collected vehicle context information 206 to the automation control application 208 when requested.

The automation control application 208 may be configured to compile the received information into the user profile 210. The user profile 210 may accordingly indicate the settings of configurable devices controlled by the user, as well as contextual information regarding the environment in which those settings were chosen. The automation control application 208 may be further configured to correlate the settings made by the user with the corresponding sensor inputs indicative of the conditions under which the user made the setting selections. In an example, the automation control application 208 may be configured to correlate climate control settings made by the user at home to outdoor temperature and time contextual information. In another example, the automation control application 208 may be configured to correlate climate control settings made by the user within the vehicle 102 to outdoor temperature and time contextual information for the vehicle 102 location.

In addition to correlations within a context, the automation control application 208 may be further configured to correlate the setting selections made by the user across contexts. As an example, the automation control application 208 may identify that, for a given ambient temperature, the user selects a higher temperature selection within the vehicle 102 than for the home. As another example, the automation control application 208 may identify that user selection of an increased blower speed in the vehicle 102 when the vehicle 102 is set to cool the cabin tends to correspond to a lower temperature selection being requested within the home as compared to situations where the blower speed is not increased. As yet a further example, the automation control application 208 may identify that an increase in heated temperature in the house on a particular day may result in an increased cabin temperature when in the vehicle 102, even if the user does not select the same exact temperature within the home and vehicle 102 environments.

The automation control application 208 may be configured to provide automation commands 212 to the automation service 202 and to the vehicle 102. In an example, to control automation service 202 functions such as temperature, the automation control application 208 may send automation commands 212 to the automation service 202 via the communications network 156. In another example, to control vehicle 102 functions, the automation control application 208 may send automation commands 212 via the paired connection between the mobile device 152 and the vehicle 102.

To determine the status information regarding user presence at a context such as the home or vehicle 102, the automation control application 208 may receive a current monitored premises status from the home automation service 202, e.g., responsive to a request regarding the home and away status of the home automation service 202. The home automation services 202 may make such information available, as the home automation services 202 may be configured to track occupancy of the automated home via motion sensors or other occupancy sensors to facilitate invocation of power-saving modes of operation when the home is unoccupied. In another example, the automation control application 208 may determine the status information regarding user presence based on the location of the mobile device 152 as compared to a known location of the home being automated. For instance, the automation control application 208 may identify that the user is home by monitoring that the current location of the mobile device 152 or the vehicle 102 is within a pre-determined threshold distance from the location of the home premises (e.g., 30 meters, 100 meters, etc.). In another example, the mobile device 152 may utilize a GPS location device of the mobile device 152 (or GPS location information received from the vehicle 102) and home location information (e.g., from a vehicle 102 or phone address book) to identify the location of the user as away from the home.

The automation control application 208 may also be configured to determine an upcoming user transition from a first climate-controlled context to a second climate-controlled context. For example, if a vehicle 102 is scheduled to be pre-conditioned for departure from the home or from work at a particular time, the automation control application 208 may determine the user to be transitioning to the vehicle 102 for the scheduled departure. As another example, historical patterns of user behavior (e.g., a work schedule) may be used to determine expected future times for user transitions between the vehicle 102 and the home. As yet another example, the automation control application 208 may monitor the current location of the mobile device 152 or the vehicle 102 in comparison to the location of the home premises, such that when the mobile device 152 or the vehicle 102 is less than a predetermined distance from the home premises (e.g., five kilometers away, fifteen minutes away, etc.) the automation control application 208 may identify the user as performing an upcoming transition.

When an upcoming user transition is detected, the automation control application 208 may be configured to determine automation commands 212 to send to the second climate-controlled context based on the correlated information gleaned from the user profile 210. These automation commands 212 may be used by the receiving context to pre-condition the context according to the user's preferences. Further aspects of the operation of the automation control application 208 are discussed with respect to FIGS. 3A-3H and 4-5 below.

Figure 3A:
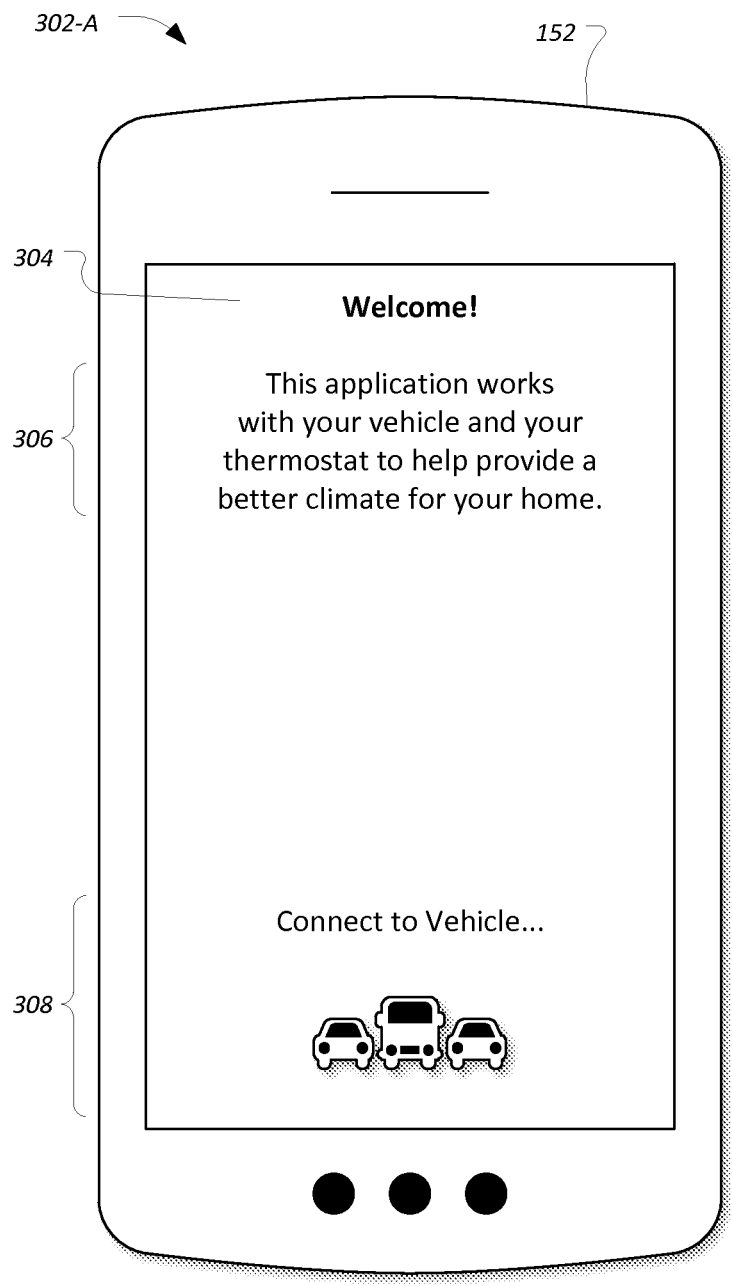
FIGS. 3A-3H illustrate user interfaces of the automation control application.

FIG. 3A illustrates an example welcome user interface 302-A of the automation control application 208. In an example, the user interfaces 302 may be presented in a display of the mobile device 152. In another example (not shown), the user interfaces 302 may be projected onto the display 138 of the vehicle 102 (e.g., via Carplay or Android Auto). In yet a further example, some or all of the functionality described as performed by the mobile device 152 may be performed using the computing platform 104 of the vehicle 102. Regardless of approach, in an example the user interface 302-A may be displayed by the automation control application 208 upon startup, and may include a title label control 304 configured to indicate to the user that the user interface 302-A is a welcome screen. The startup user interface 302-A may further include a description label 306 configured to provide introductory information regarding the function of the automation control application 208, which may be useful for new users.

The startup user interface 302-A may also include a status indicator 308 descriptive of the current startup status of the automation control application 208. As shown, the automation control application 208 indicates that the automation control application 208 is currently attempting to connect to the vehicle 102 to facilitate vehicle control and monitoring functionality. Connection to the vehicle 102 may include, for example, pairing with computing platform 104 of the vehicle 102. In another example, connection to the vehicle 102 may include wireless connection over the communications network 156 with the in-vehicle modem 144.

Figure 3B:
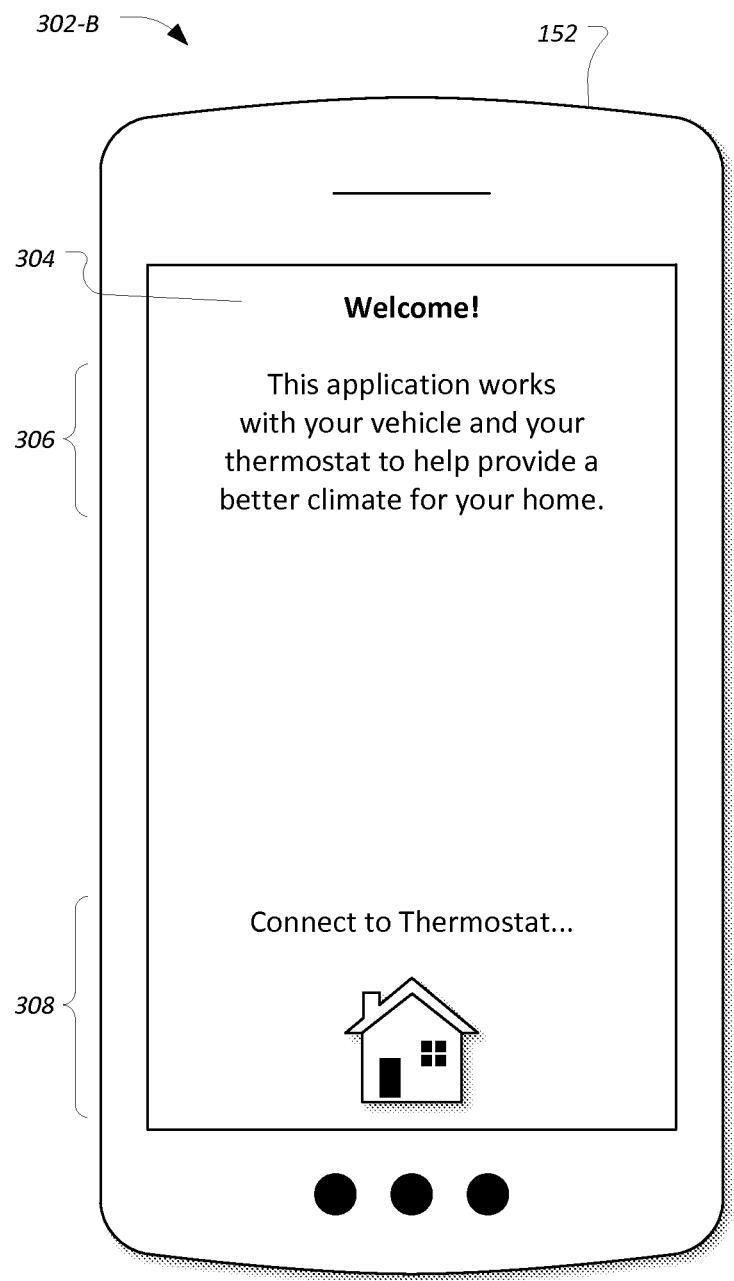

The status indicator 308 may also show other status information as well. For example as illustrated in FIG. 3B, the status indicator 308 may indicate that the automation control application 208 is attempting connection to the home automation service 202 to facilitate thermostat control functionality. Connecting to the home automation service 202 may include, for example, sending an account name and/or user credentials over the communication network 156 to the home automation service 202, and receiving a response from the home automation service 202 establishing a control session with the home automation service 202.

Figure 3C:
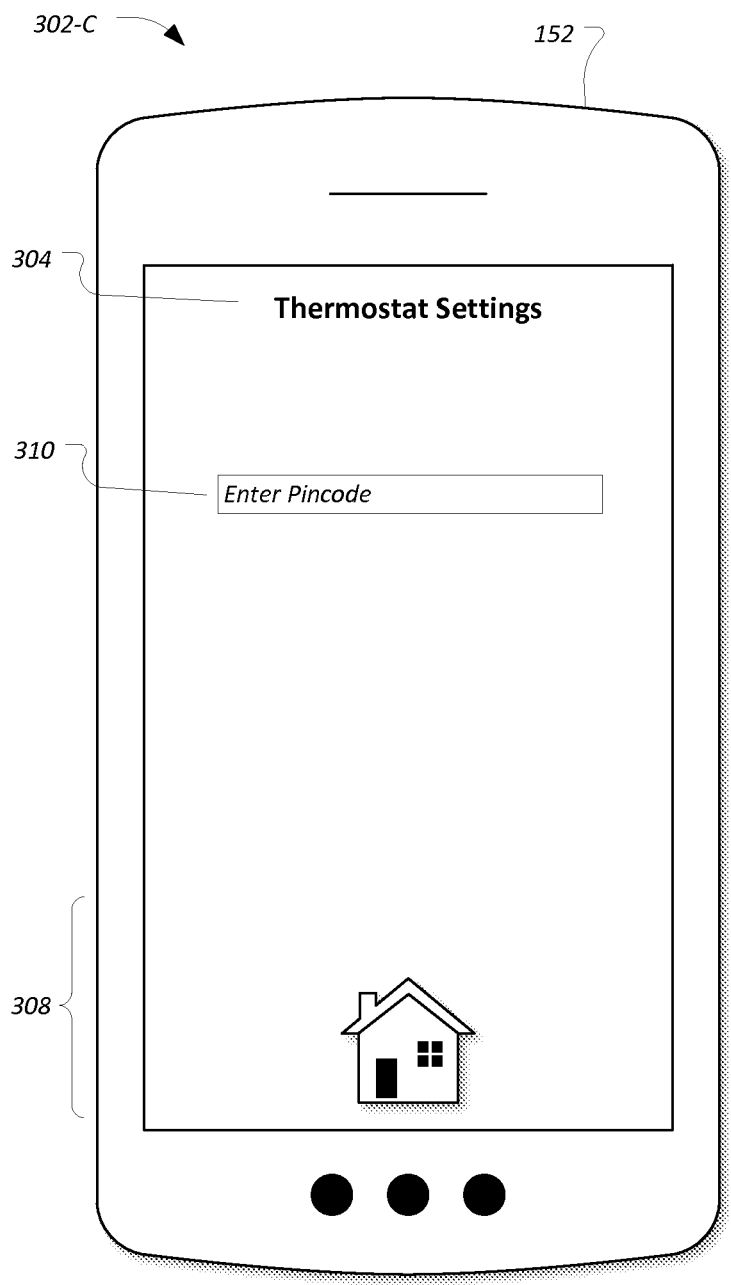

FIG. 3C illustrates an example automation service 202 configuration user interface 302-C of the automation control application 208. The user interface 302-A may be displayed by the automation control application 208, for example, upon unsuccessful connection to the home automation service 202 or upon initial use of the automation control application 208. The title label control 304 of the home configuration user interface 302-C may indicate to the user that the user interface 302-A is for entry of settings for configuration of the connection to the home automation service 202. The user interface 302-C may further include additional controls for receiving login credentials, such as a pincode entry control 310 or other controls for receiving credentials to provide to the home automation service 202 to establish the connection with the home automation service 202.

Figure 3D:
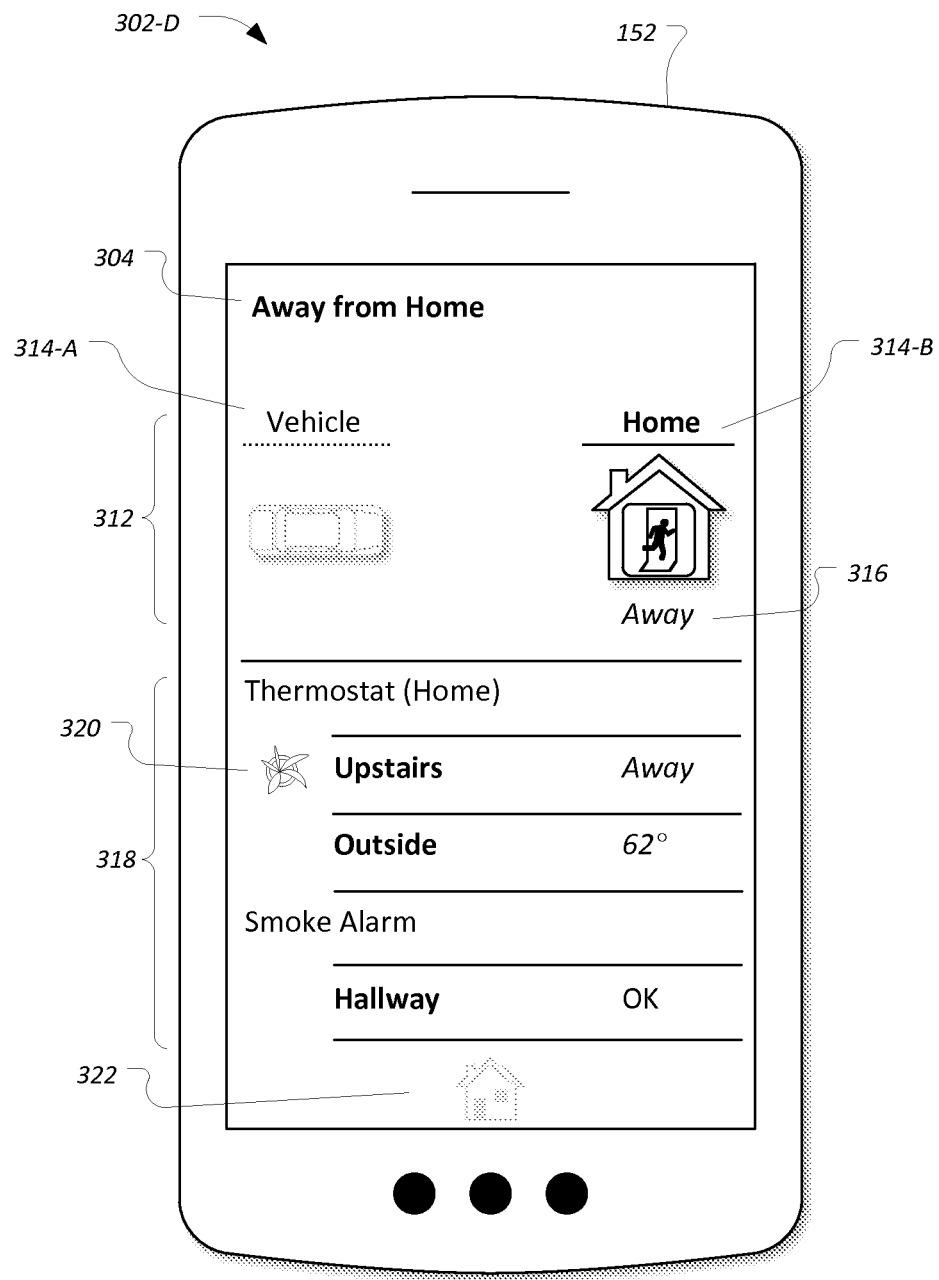

FIG. 3D illustrates an example main user interface 302-D of the automation control application 208. The user interface 302-D may be displayed by the automation control application 208, for example, upon successful connection to the home automation service 202 and/or to the vehicle 102. The main user interface 302-D may be configured to indicate the presence state of the user with respect to the home premises via the title label control 304. The main user interface 302-D may also include a context selector control 312 from which the user may select to display vehicle 102 or home automation service 202 settings, as well as a context details pane 318 to display the details of the selected context.

As shown, the title label control 304 indicates that the user is away from the premises controlled by the home automation service 202. In other examples, the title label control 304 may illustrate that the user is at home, that the user is preparing to depart the home, or that the user is preparing to arrive at the home.

The context selector control 312 may be configured to allow the user to select whether the context details pane 318 should display information regarding the vehicle 102 context or the home context. As illustrated, the context selector control 312 includes an entry 314-A for display of vehicle 102 information and an entry 412-B for display of home information. The context selector control 312 may operate as a menu, such that a user of the user interface 302-D may be able to touch and select the desired context. It should be noted that, in some cases more than two contexts may be available for selection. For instance, a user having multiple vehicles 102 or multiple homes may have additional contexts available for selection. The context selector control 312 may be further configured to represent the currently selected entry 314 and the unselected entries 314 differently such that the user may be able to distinguish which is the currently selected entry 314. As one non-limiting possibility, as shown the currently selected entry 314 may be rendered in a darker color than the unselected entries 314.

The context selector control 312 may be further configured to display status information regarding the available contexts. For instance, for the home entry 412-B, the context selector control 312 provides an away indication 316 to indicate in the user interface that the status of the home automation service 202 for the home is away. When in the away state, the context selector control 312 may also illustrate the home with an icon illustrative of the away status. It should be noted that the away status displayed in the context selector control 312 may differ from that of the status information displayed in the title label control 304. For example, if the user is away from the home then the label may indicate the user is away from home, but if another person is at the home, the home may not be in the away status.

The context details pane 318 may be configured to illustrate status information regarding the context selected via the context selector control 312. As shown, the context details pane 318 includes information regarding the status of the selected home context corresponding to the entry 314-B. To determine the status information to include in the context details pane 318, the automation control application 208 may request and receive a current monitored premises status from the home automation service 202. For instance, the context details pane 318 for a home thermostat indicates that the thermostat is set to an away mode in which climate control power is conserved, because the home is in an away status. As a further illustration of the away status, the context details pane 318 includes a status icon 320 indicative of the eco-status of the upstairs thermostat. The context details pane 318 further indicates that the outside temperature as measured at the home is 62 degrees Fahrenheit. Additionally, the context details pane 318 provides information regarding a smoke alarm sensor located in a hallway of the home. As a further illustration of the context being displayed in the context details pane 318, the context details pane 318 may further include a context watermark 322 indicative of which of the contexts is being displayed. For the user interface 302-D, the context watermark 322 indicates that home information is being displayed.

Figure 3E:
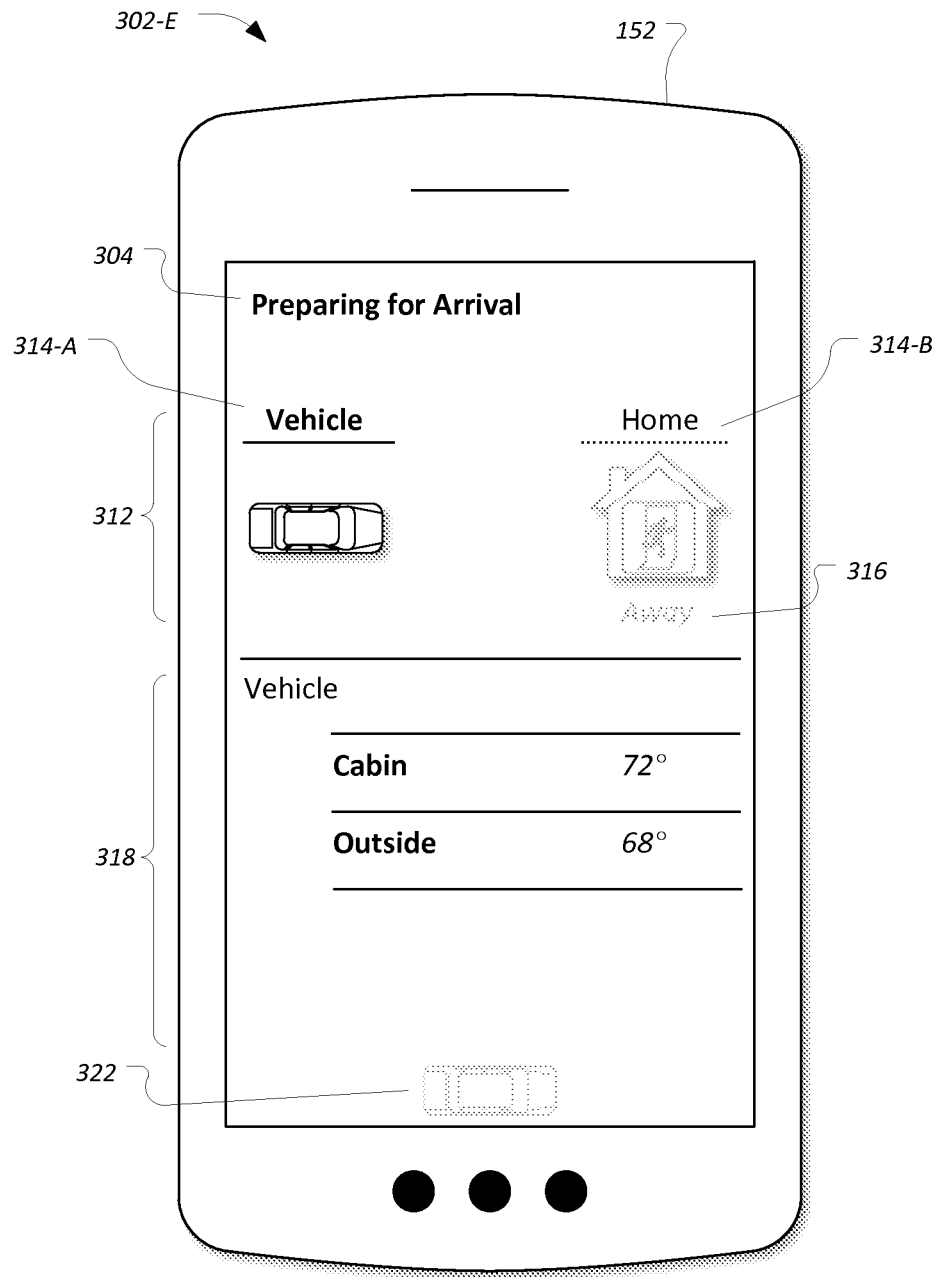

FIG. 3E illustrates another example main user interface 302-E of the automation control application 208. As compared to the user interface 302-D, the user interface 302-E displays information for the vehicle context in the context details pane 318, as selected from the context selector control 312. For instance, the context details pane 318 displays current cabin setting and outside temperature sensor information for the selected vehicle 102. Additionally, the context watermark 322 is updated to indicate that vehicle 102 information is being displayed.

Notably, the title label control 304 in the main user interface 302-E indicates that the user is preparing for arrival to the premises controlled by the home automation service 202. For example, the automation control application 208 may have determined that the vehicle 102 is traveling towards the home premises and is less than a predetermined threshold distance from the home.

As an upcoming user transition is detected, the automation control application 208 may be configured to determine automation commands 212 to send to the home automation service 202 to prepare for the arrival of the user. In an example, the automation control application 208 may be configured to send an automation command 212 to the home automation service 202 to take the home premises out of the away mode. In another example, the automation control application 208 may be configured to send an automation command 212 to the home automation service 202 to adjust a climate settings controlled by the home automation service 202 in accordance with user preferences identified from the user profile 210. This request may accordingly provide the home automation service 202 with additional time to condition the home premises as compared to systems that detect the user only upon return, such as via motion or other sensors of the home.

Figure 3F:
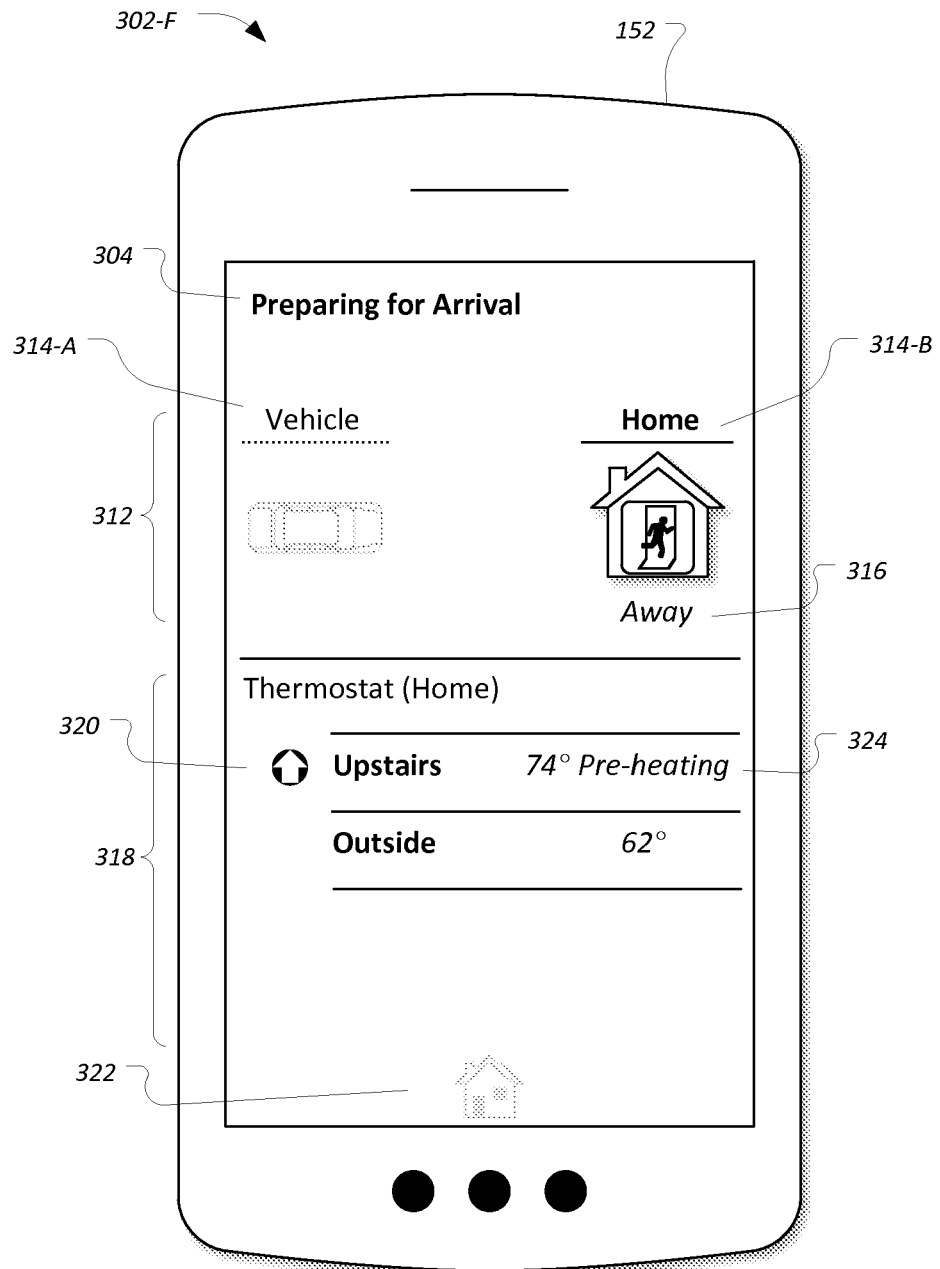

FIG. 3F illustrates an example main user interface 302-F of the automation control application 208 indicating a pre-conditioning operation specified by the automation control application 208. The pre-conditioning operation may be requested by the automation control application 208 responsive to determination that the user is preparing for arrival at the home premises.

As shown, the user interface 302-F displays information for the home context in the context details pane 318, e.g., as selected from the context selector control 312. Within the context details pane 318, the status icon 320 may be displayed to indicate the pre-heating status of the upstairs thermostat. As shown, the status icon 320 is illustrated as an up arrow to indicate heating, but in other examples the status icon 320 may use color (e.g., red) to indicate heating. The user interface 302-F may further include a zone status label control 324 including content descriptive of the pre-conditioning operation being performed (e.g., "pre-heating" in the illustrated example). Accordingly a user of the mobile device 152 may be able to view and understand any pre-conditioning operations being performed at the home premises by the home automation service 202.

Figure 3G:
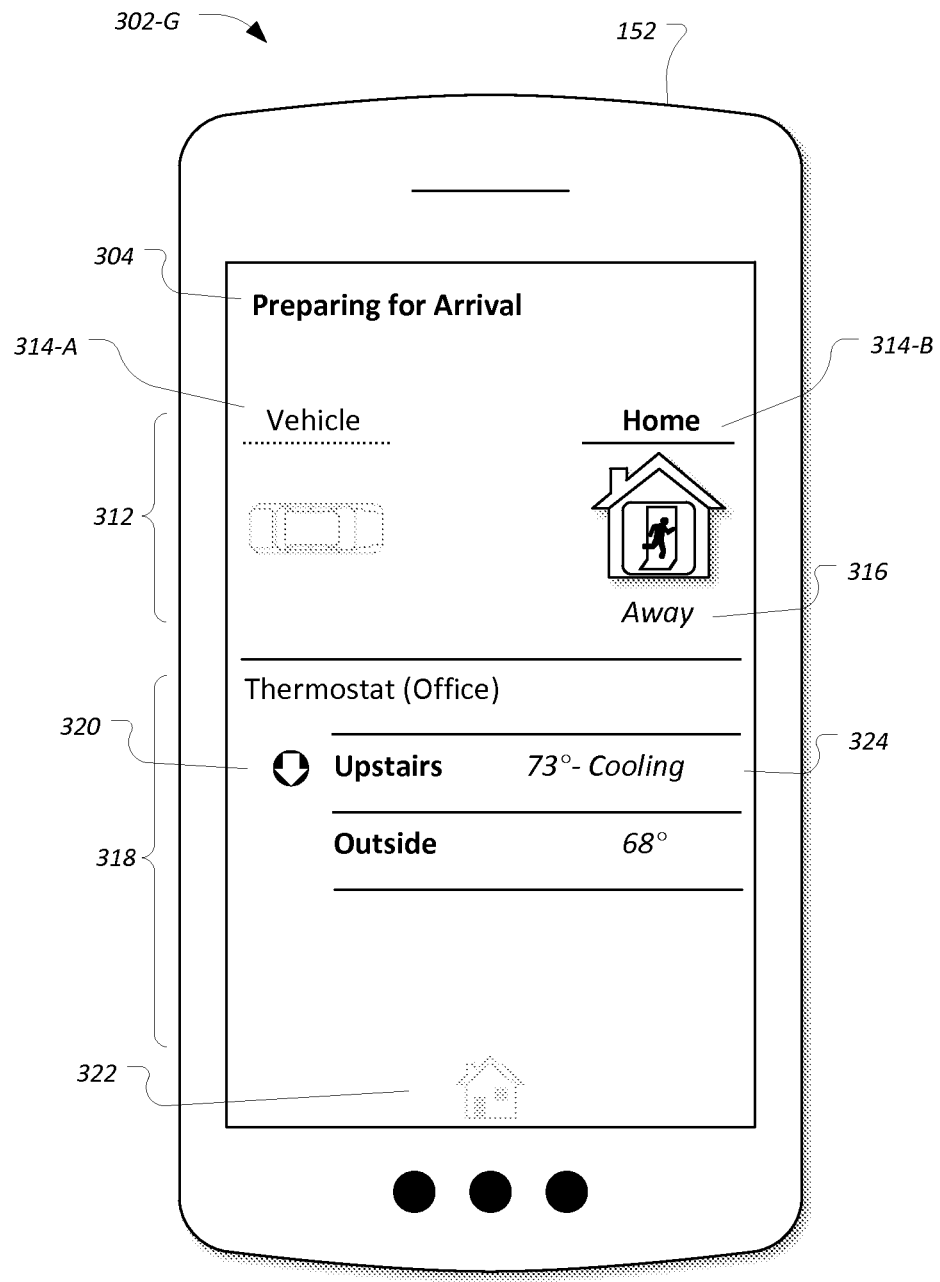

FIG. 3G illustrates another example main user interface 302-G of the automation control application 208 illustrating an operation being performed by the home automation service 202. As shown in the user interface 302-G, a cooling operation is being performed in another zone of the home premises (e.g., the office zone as compared to the upstairs zone discussed above). As shown, the status icon 320 is illustrated as a down arrow to indicate cooling, but in other examples the status icon 320 may use color (e.g., blue) to indicate heating. Notably, the zone status label control 324 indicates cooling, but not pre-cooling, to allow the user to distinguish between those operations requested in anticipation of user arrival, and those performed by the home automation service 202 during normal operation (e.g., away mode operation in the instant example).

Figure 3H:
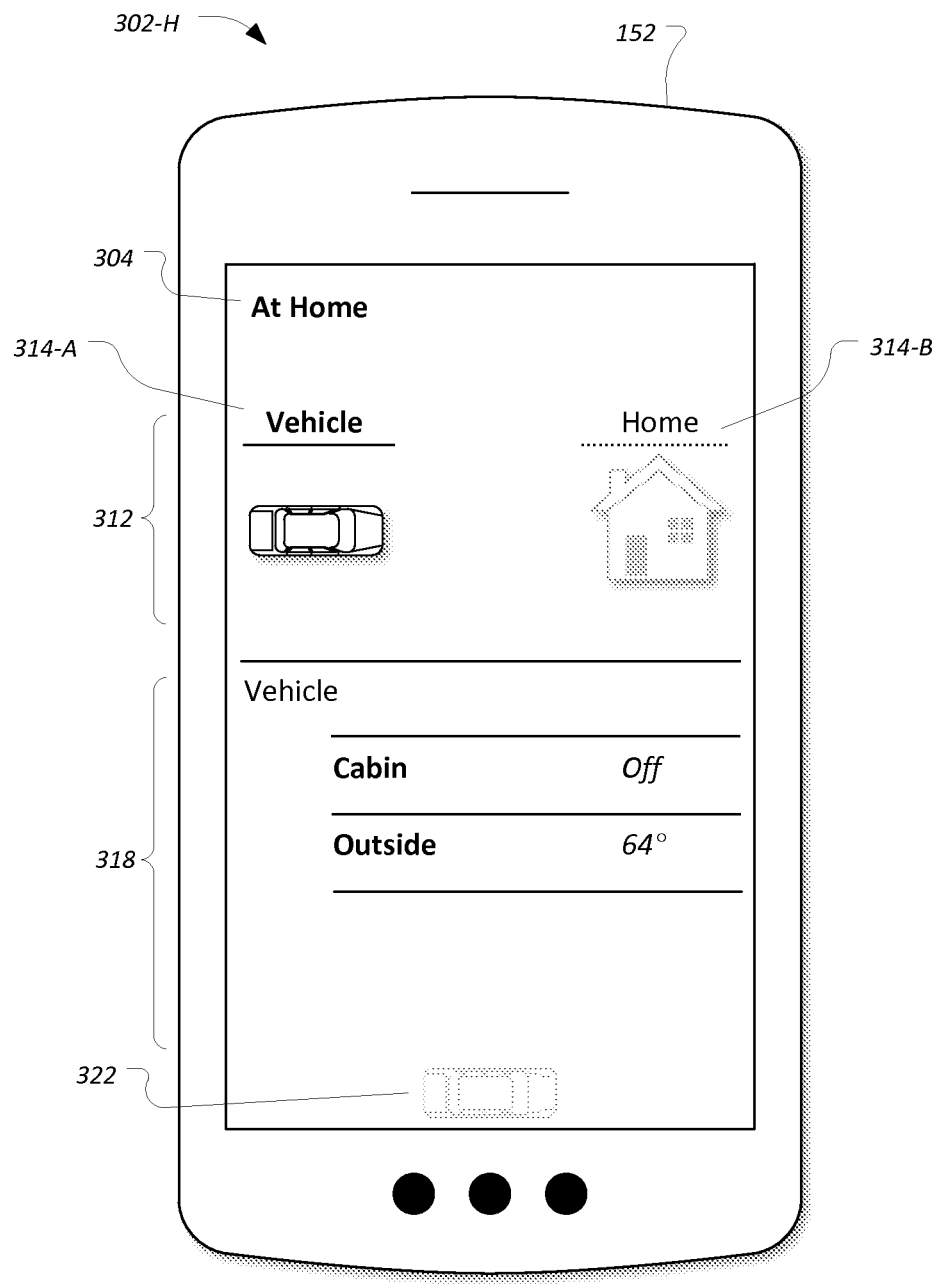

FIG. 3H illustrates an example main user interface 302-H of the automation control application 208 displayed when the user has returned to the home premises. For example, the automation control application 208 may identify that the user is home by monitoring that the current location of the mobile device 152 or the vehicle 102 is within a predetermined threshold distance from the location of the home premises (e.g., 100 feet 300 feet, etc.). The title label control 304 may accordingly be updated to indicate that the user is at home. Moreover, as the vehicle 102 is no longer in operation, the current vehicle 102 status information may indicate that the cabin climate control systems are off.

Figure 4:
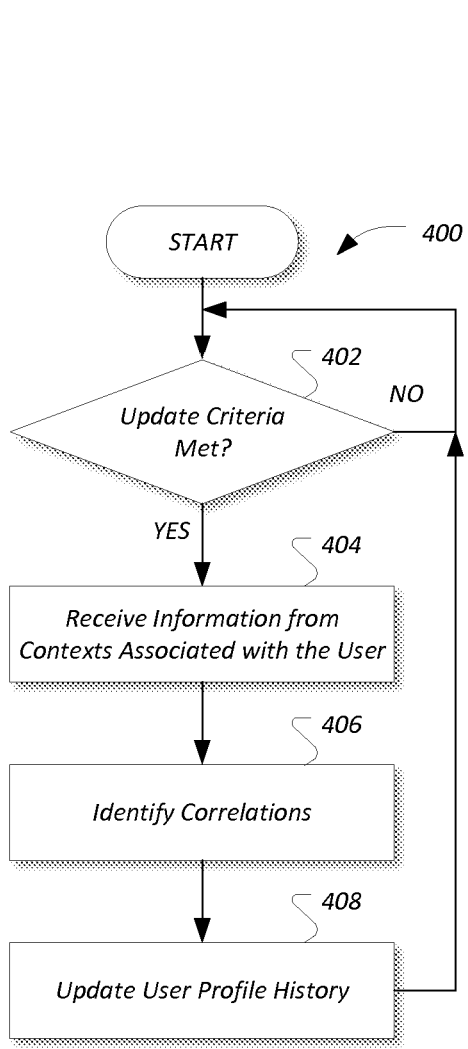
FIG. 4 illustrates an example process for updating a user profile according to information received from a plurality of contexts.

FIG. 4 illustrates an example process 400 for updating a user profile 210 according to information received from a plurality of contexts. The process 400 may be performed, for example, by the automation control application 208 executed by the mobile device 152. In another example, the process 400 may be performed by the automation control application 208 executed by the computing platform 104.

At operation 402, the automation control application 208 determines whether criteria are met for updating the user profile 210. In an example, the automation control application 208 may be configured to determine whether a timeout (e.g., one minute, three hours, one day, etc.) has expired since the last update to the user profile 210, and may determine to perform an update if the time has expired. In another example, the automation control application 208 may be configured to update the user profile 210 based on occurrence of one or more conditions, such as a predetermined distance traveled by the vehicle, a predetermined number of key-on cycles, at every key-on, and/or responsive to user input. If the automation control application 208 determines to perform an update, control passes to operation 404. Otherwise, control remains at operation 402.

At operation 404, the automation control application 208 receives information from one or more user contexts. In an example, the automation control application 208 may be configured to query the automation service 202 over the communications network 156 for home context information 204 using security credentials provided by the user of the mobile device 152. In another example, the automation control application 208 may be configured to query the vehicle 102 for the vehicle context information 206 while paired with the computing platform 104 or over the communications network 156 via connection to the in-vehicle modem 144. In yet a further example, a vehicle application 110 installed to the computing platform 104 may be configured to monitor the vehicle context information 206, and may provide the collected vehicle context information 206 to the automation control application 208 when requested.

At operation 406, the automation control application 208 identifies correlations in the user profile 210 information. As an example, the automation control application 208 may identify that, for a given ambient temperature, the user selects a higher temperature selection within the vehicle 102 than for the home. As another example, the automation control application 208 may identify that user selection of an increased blower speed in the vehicle 102 when the vehicle 102 is set to cool the cabin tends to correspond to a lower temperature selection being requested within the home as compared to situations where the blower speed is not increased. As yet a further example, the automation control application 208 may identify that an increase in heated temperature in the house on a particular day may result in an increased cabin temperature when in the vehicle 102, even if the user does not select the same exact temperature within the home and vehicle 102 environments.

At operation 408, the automation control application 208 updates the user profile 210. In an example, the automation control application 208 may update the user profile 210 with the received home context information 204 and vehicle context information 206, as well as with any correlations identified at operation 406. After operation 408, control passes to operation 402 to continue the process 400.

Figure 5:
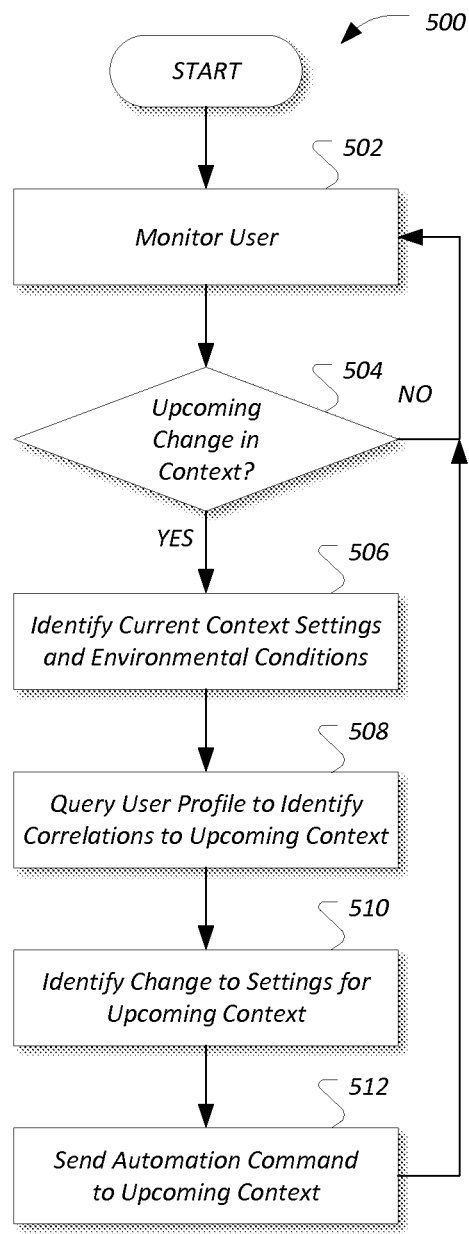
FIG. 5 illustrates an example process for pre-conditioning a context according to the user profile.

FIG. 5 illustrates an example process 500 for pre-conditioning a context according to the user profile 210. As with the process 400, the process 500 may be performed, for example, by the automation control application 208 executed by the mobile device 152.

At operation 502, the automation control application 208 monitors the user. For instance, the automation control application 208 may identify that the user is home by monitoring that the current location of the mobile device 152 or the vehicle 102 is within a pre-determined threshold distance from the location of the home premises (e.g., 30 meters, 100 meters, etc.). In another example, the mobile device 152 may utilize a GPS location device of the mobile device 152 (or GPS location information received from the vehicle 102) and home location information (e.g., from a vehicle 102 or phone address book) to identify the location of the user as away from the home.

At operation 504, the automation control application 208 identifies an upcoming user transition from a first climate-controlled context to a second climate-controlled context. In an example, the user may place the vehicle 102 into drive or reverse, signaling that the user has left the home premises for the vehicle 102. In another example, if a vehicle 102 is scheduled to be pre-conditioned for departure from the home or from work at a particular time, the automation control application 208 may determine the user to be transitioning to the vehicle 102 for the scheduled departure. In yet another example, historical patterns of user behavior (e.g., a work schedule) may be used to determine expected future times for user transitions between the vehicle 102 and the home. In a further example, the automation control application 208 may monitor the current location of the mobile device 152 or the vehicle 102 in comparison to the location of the home premises, such that when the mobile device 152 or the vehicle 102 is less than a predetermined distance from the home premises (e.g., five kilometers away, fifteen minutes away, etc.) the automation control application 208 may identify the user as performing an upcoming transition.

At operation 506, the automation control application 208 identifies current context settings and environmental conditions for the user. In an example, the automation control application 208 may retrieve current temperature settings, blower settings, and ambient temperature settings from the vehicle 102. In another example, the automation control application 208 may retrieve current temperature settings from the home automation service 202 for the various zones of the home premises.

At operation 508, the automation control application 208 queries the user profile 210 to identify correlations to the upcoming context. In an example, the automation control application 208 utilizes the correlations identified using the process 400 to determine settings for the upcoming context that may be desired by the user based on the current settings of the current and upcoming contexts.

At operation 510, the automation control application 208 identifies any changes to settings for the upcoming context. In an example, the automation control application 208 utilizes the current settings for the upcoming context retrieved at operation 506 and the desired settings identified at operation 508 to determine what changes are required to the settings of the upcoming context. In other examples, the automation control application 208 may simply elect to apply any settings identified at 508, regardless of whether they are changes from the current settings. In yet another example, the automation control application 208 may identify to remove the upcoming context from away mode before the user returns.

At operation 512, the automation control application 208 sends an automation command 212 to the upcoming context to apply the identified setting change for the upcoming context. The automation control application 208 may also send an automation command 212 to the current context requesting an away status when the user leaves the current context. Accordingly, the automation control application 208 may update climate settings with respect to user movements and preferences. After operation 512, control returns to operation 502.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a computing device programmed to
identify an upcoming user transition from a first climate-controlled context to a second climate-controlled context; and
precondition the second context in accordance with a correlation, for current environmental conditions, of climate control selections in the first context to different climate control selections in the second context, the correlation identified according to a user profile including historical climate control selections and environmental conditions across a plurality of climate-controlled contexts,
wherein one of (i) the first climate-controlled context is a home premises and the second climate-controlled context is a vehicle or (ii) the first climate-controlled context is the vehicle and the second climate-controlled context is the home premises.

2. The system of claim 1, wherein the computing device is further programmed to identify the user transition according to a comparison of a location of the vehicle to a location of the home premises.

3. The system of claim 1, wherein the computing device is further programmed to precondition by sending an automation command to the second climate-controlled context to instruct the second climate-controlled context to adjust temperature settings of the second climate-controlled context in accordance with the correlation identified according to the user profile.

4. The system of claim 3, wherein the correlation indicates a temperature setting of the second climate-controlled context likely to be selected by the user according to the temperature setting of the first climate-controlled context and the current environmental conditions.

5. The system of claim 3, wherein the temperature setting of the first climate-controlled context and the temperature setting of the second climate-controlled context specify different temperatures.

6. The system of claim 1, wherein the computing device is further programmed to set the first climate-controlled context to an away status upon the user transition to the second climate-controlled context.

7. The system of claim 1, wherein the computing device is one of a smartphone and a vehicle computing system.

8. A computer-implemented method comprising:
identifying an upcoming user transition from a home premises climate-controlled context to a vehicle climate-controlled context; and
preconditioning the vehicle context in accordance with a correlation, for current environmental conditions, of climate control selections in the home premises context to different climate control selections in the vehicle context, the correlation identified according to a user profile including historical climate control selections and environmental conditions across a plurality of climate-controlled contexts.

9. The method of claim 8, further comprising identifying the user transition according to a comparison of a location of the vehicle to a location of the home premises.

10. The method of claim 8, further comprising preconditioning by sending an automation command to the vehicle climate-controlled context to instruct the vehicle climate-controlled context to adjust temperature settings of the vehicle climate-controlled context in accordance with the correlation identified according to the user profile.

11. The method of claim 10, wherein the correlation indicates a temperature setting of the vehicle climate-controlled context likely to be selected by the user according to the temperature setting of the home premises climate-controlled context and the current environmental conditions, wherein a temperature setting of the home premises climate-controlled context and the temperature setting of the vehicle climate-controlled context specify different temperatures.

12. A computer-implemented method comprising:
identifying an upcoming user transition from a vehicle climate-controlled context to a home premises climate-controlled context; and
preconditioning the home premises context in accordance with a correlation, for current environmental conditions, of climate control selections in the vehicle context to different climate control selections in the home premises context, the correlation identified according to a user profile including historical climate control selections and environmental conditions across a plurality of climate-controlled contexts.

13. The method of claim 12, further comprising identifying the user transition according to a comparison of a location of the home premises to a location of the vehicle.

14. The method of claim 12, further comprising preconditioning by sending an automation command to the home premises climate-controlled context to instruct the home premises climate-controlled context to adjust temperature settings of the home premises climate-controlled context in accordance with the correlation identified according to the user profile.

15. The method of claim 14, wherein the correlation indicates a temperature setting of the home premises climate-controlled context likely to be selected by the user according to the temperature setting of the vehicle climate-controlled context and the current environmental conditions, wherein a temperature setting of the vehicle climate-controlled context and the temperature setting of the home premises climate-controlled context specify different temperatures.

* * * * *